United States Patent
Jing

(10) Patent No.: US 7,180,734 B2
(45) Date of Patent: Feb. 20, 2007

(54) MOUNTING ASSEMBLY FOR DATA STORAGE DEVICE

(75) Inventor: Xiao-Zhong Jing, Shenzhen (CN)

(73) Assignees: Hong Fu Jin Precision Industry (Shenzhen) Co. Ltd. (CH); Hon Hai Precision Industry Co., Ltd. (TW)

( * ) Notice: Subject to any disclaimer, the term of this patent is extended or adjusted under 35 U.S.C. 154(b) by 265 days.

(21) Appl. No.: 11/021,924

(22) Filed: Dec. 23, 2004

(65) Prior Publication Data

US 2006/0002078 A1    Jan. 5, 2006

(30) Foreign Application Priority Data

Jul. 2, 2004   (CN) ................ 2004 2 00712722

(51) Int. Cl.
*G06F 1/16* (2006.01)
(52) U.S. Cl. .............. 361/685; 248/298.1; 248/222.11; 312/223.1
(58) Field of Classification Search ................ 361/685, 361/683, 724–727, 679; 248/298.1, 694, 248/222.11; 312/223.1, 223.2
See application file for complete search history.

(56) References Cited

U.S. PATENT DOCUMENTS

| | | | |
|---|---|---|---|
| 6,299,266 B1 * | 10/2001 | Justice et al. ............. | 312/223.2 |
| 6,304,457 B1 * | 10/2001 | Liu et al. .................... | 361/685 |
| 6,728,109 B1 * | 4/2004 | Wu ............................. | 361/685 |
| 6,853,549 B2 * | 2/2005 | Xu .............................. | 361/685 |
| 6,882,526 B2 * | 4/2005 | Neukam et al. ............ | 361/685 |
| 6,935,604 B2 * | 8/2005 | Chen .......................... | 248/694 |
| 2004/0037049 A1 * | 2/2004 | Erickson et al. ............ | 361/726 |
| 2005/0007732 A1 * | 1/2005 | Hsu ............................ | 361/685 |
| 2005/0190535 A1 * | 9/2005 | Peng et al. ................. | 361/685 |

FOREIGN PATENT DOCUMENTS

| TW | 190919 | 9/1992 |
|---|---|---|
| TW | 414354 | 12/2000 |

* cited by examiner

Primary Examiner—Lisa Lea-Edmonds
(74) Attorney, Agent, or Firm—Morris Manning & Martin LLP; Tim Tingkang Xia, Esq.

(57) ABSTRACT

A mounting assembly for data storage device includes a data storage device (10) with fixing holes (14) along two opposite sidewalls, a cage (20) receiving the data storage device, a fixing member (40) and an elastic portion (50). The cage defines a plurality of mounting holes (28) corresponding to the fixing holes. The fixing member movably engages with the cage. A plurality of attaching pins (44) is extended from the fixing member. A resilient member (30) deformed under pressure comprises two wings and received between the cage and the fixing member. When the resilient member is deformed, the fixing member is forced apart from the cage and the elastic portion is compressed; when the resilient member reinstates, the compressed elastic portion pushes the fixing member to approach the cage, so that the attaching pins on the fixing member can be automatically inserted into or retreated from the fixing holes of the data storage device.

20 Claims, 6 Drawing Sheets

MOUNTING ASSEMBLY FOR DATA STORAGE DEVICE

BACKGROUND OF THE INVENTION

1. Field of the Invention

The present invention relates to a mounting assembly for data storage devices, and more particularly to a mounting assembly with a simplified configuration and convenient to use.

2. Description of Related Art

Various data storage devices are installed in electronic apparatus for communication and handling of data. Such devices include, for example, hard disk drives, floppy disk drives and Compact Disk-Read Only Memory (CD-ROM) drives. A typical mounting assembly for data storage devices usually utilizes a plurality of screws, directly attaching a data storage device to a computer chassis. However, screwdrivers or other detaching tooling are necessary for installation or removal of the data storage device to dismantle/mount screws in assembly or disassembly processes, which causes inconvenience and time-consuming issues.

A conventional mounting assembly for a data storage device is disclosed in Taiwan patent publication No. 190, 919. The mounting assembly for data storage devices comprises a data storage device with a pair of rails on opposite sides thereof, and a cage defining two fixing holes. Each rail defines a screw hole corresponding to that of the cage at a distal end thereof. Two screws get through the mounting holes of the cage and received in the screw holes, thereby mounting the data storage device to the cage. However screws are used, screwdrivers or other detaching tooling are still necessary.

Another typical mounting assembly for data storage devices is disclosed in Taiwan patent publication No. 414, 354. The mounting assembly for data storage devices comprises a data storage device defining a plurality of fixing holes in opposite sides thereof, a cage defining a plurality of fixing openings corresponding to the fixing holes in the data storage device, and a fixing plate. A plurality of pins corresponding to the fixing holes of the data storage device extends from one side of the fixing plate. When the data storage device is received in the cage, the fixing plate clips on the cage and the pins of the fixing plate get through the fixing openings and received in the fixing holes, thereby mounting the data storage device into the cage.

However, the foregoing conventional mounting assembly for a data storage device usually engages more than one data storage device, the fixing holes in all the data storage devices must be simultaneously aligned with corresponding fixing openings, which causes unduly inconvenience and unduly time-consuming issues in data storage device assembly or disassembly process. In addition, the pins of the fixing plate cannot automatically be inserted into the fixing holes of the data storage device, and a user has to finish the manual operation. So a convenient mounting assembly for data storage devices, overcoming the problems mentioned above is desired.

SUMMARY OF THE INVENTION

Accordingly, an object of the present invention is to provide a mounting assembly for data storage devices with a simplified configuration, and convenient to use.

To achieve the above object, a mounting assembly for data storage devices in accordance with a preferred embodiment of the present invention comprises a data storage device, a cage, a fixing member and a resilient member. The data storage device defines a plurality of fixing holes along two opposite sidewalls. The cage receiving the data storage device comprises a side plate. The side plate defines a plurality of mounting holes corresponding to the fixing holes in the data storage device. The side plate forms two pillars with screw holes. The fixing member defines two mounting apertures to receive the pillars so as to hang the fixing member onto the cage. The fixing member is movable in a direction perpendicular to the side plate, and forms a plurality of attaching pins corresponding to the fixing holes in the data storage device. The fixing member defines an opening in the middle portion thereof. The resilient member has two wings received between the side plate of the cage and the fixing member. The resilient member comprises a pressing portion sticking out from the opening of the fixing member and a pushing portion at the free end of each wing to force the fixing member moving apart from the cage. An elastic portion surrounds each pillar. A screw received in the screw hole of each pillar, mounts the fixing member to the cage. When the resilient member is deformed, the elastic portion around each pillar is compressed, and the fixing member is forced apart from the cage. When the resilient member reinstates, the compressed elastic portion pushes the fixing member to approach the cage, thereby the attaching pins on the fixing member are automatically inserted into or retreated from the fixing holes of the data storage device to lock or detach the data storage device.

Other objects, advantages and novel features of the present invention will be drawn from the following detailed description of preferred embodiment of the present invention with the attached drawings, in which:

DETAILED DESCRIPTION OF THE INVENTION

Figure 1:
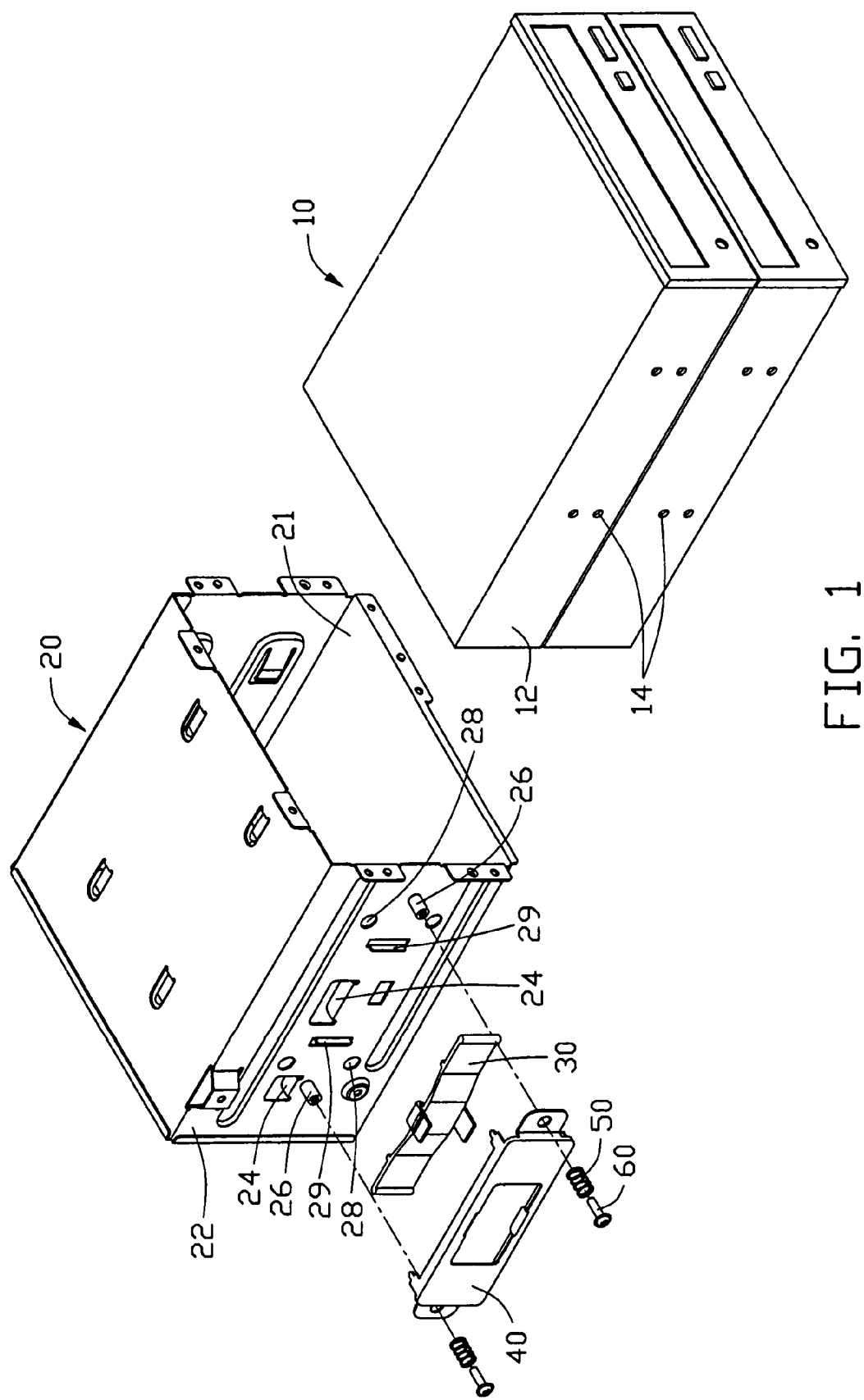
FIG. 1 is an exploded, isometric view of a mounting assembly for data storage devices in accordance with a preferred embodiment of the present invention comprising a resilient member, a fixing member and a cage.

Referring to FIG. 1, a mounting assembly for data storage devices for fixing a plurality of data storage devices 10 in accordance with the preferred embodiment of the present invention comprises a cage 20, a resilient member 30, a fixing member 40, two elastic portions 50 and two attaching members 60. In the preferred embodiment of the present invention, each elastic portion 50 can adopt a spring or a similar elastic component like the spring. Each attaching member 60 in the preferred embodiment can be a screw or a similar fixing member such as a riveting nail.

Each data storage device 10 defines a plurality of fixing hole 14 in a sidewall 12 therein. The cage 20 is mounted into a computer chassis (not shown), and comprises a bottom plate 21. A side plate 22 is vertically extended form an edge of the bottom plate 21. A pair of interior tabs 24 is extended inwardly from the side plate 22 to support a corresponding data storage device 10. A pair of pillars 26 with a screw hole (not shown) is formed at the exterior side of the side plate 22. For round mounting holes 28 divided into two groups, corresponding to the fixing holes 14 of the data storage device 10, are defined in the side plate 22 between the two pillars 26. A pair of exterior tabs 29 for locating the resilient member 30 is outwardly extended from the side plate 22 in the middle portion thereof.

Figure 2:
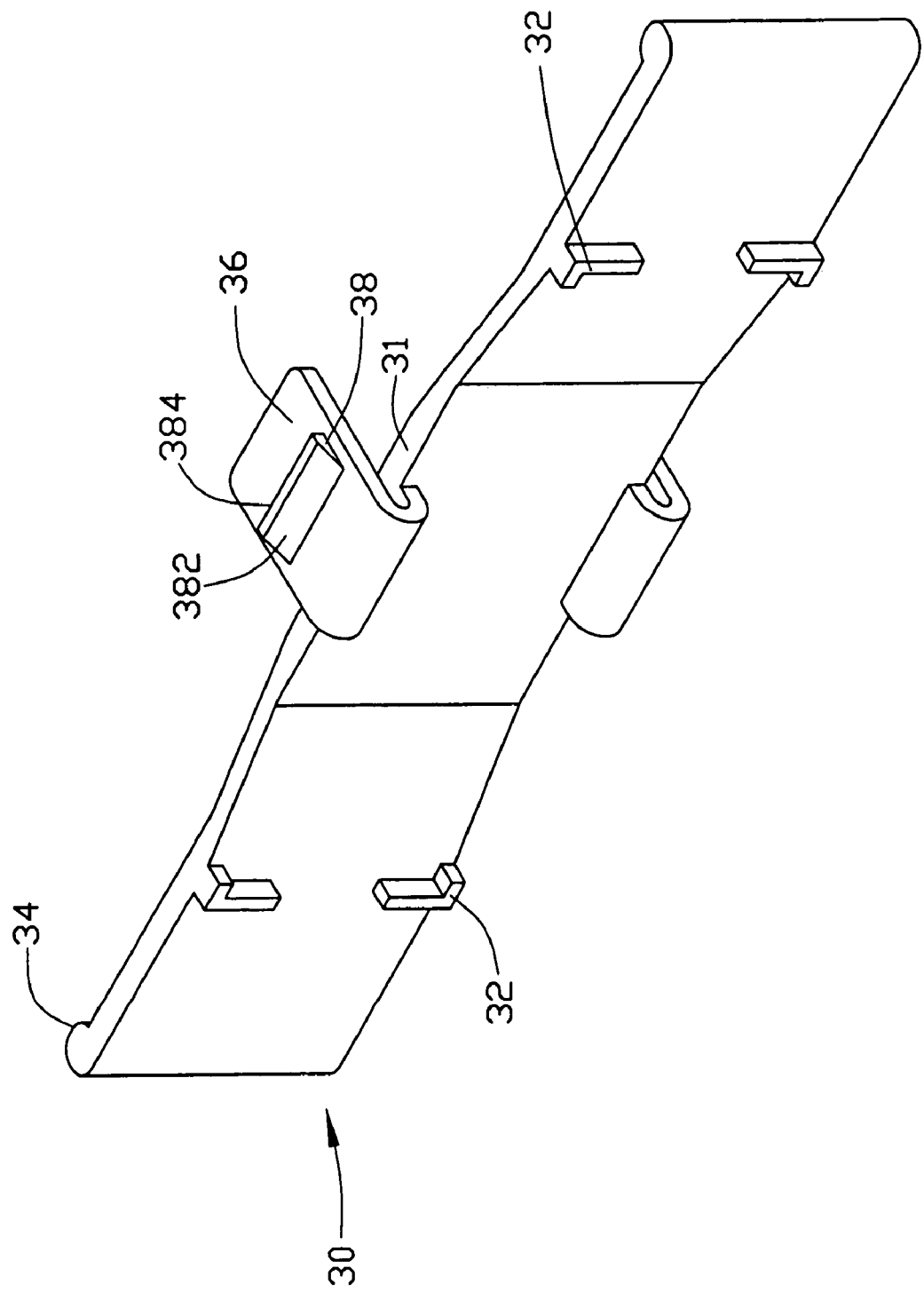
FIG. 2 is an enlarged, isometric view of the resilient member of FIG. 1 viewed from another aspect thereof.

Referring also to FIG. 2, the resilient member 30 is generally V-shaped. An outward protuberant pressing portion 31 is formed in the middle portion of the resilient member 30, two symmetrical curved wings (not labeled) are formed respectively from two sides of the pressing portion 31, and the free end of each curved wing forms a pushing portion 34 outwardly. Two L-shaped handles 36 is outwardly extended from respective top and bottom edges of the resilient member 30 in close proximity to the pressing portion 31. Each handle 36 forms a wedge-shaped blocking portion 38 on its top thereof. The wedge-shaped blocking portion 38 comprises a top face and a slant face 382. The resilient member 30 further forms four L-shaped receiving bases 32, divided into two groups, which cooperatively receive the exterior tabs on side plate 22 of the cage 20.

Figure 3:
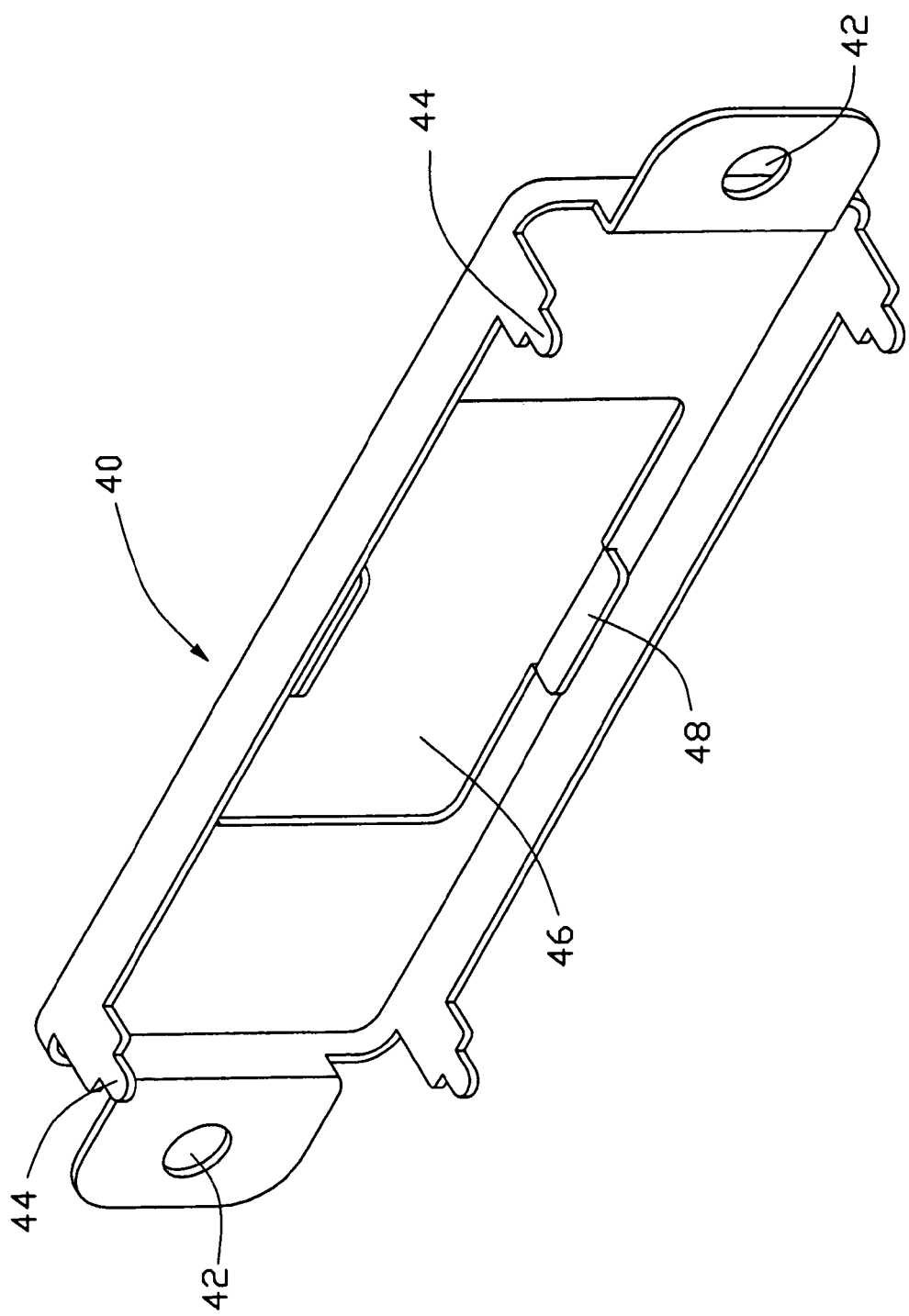
FIG. 3 is an enlarged, isometric view of the fixing member of FIG. 1, viewed from another aspect.

Referring also to FIG. 3, the fixing member 40 is generally rectangular, and defines two mounting apertures 42 in left and right side portions therein, corresponding to the pillars 26 of the cage 20. Four attaching pins 44, divided into two groups, corresponding to the four mounting holes 28 in the side plate 22 of the cage 20, are extended from respective top and bottom edge portions of the fixing member 40. A rectangular opening 46 is defined in the middle of the fixing member 40 for the handles 36 of the resilient member 30 getting through. Two locating brims 48 are extended from respective top and bottom edges of the opening 46.

Figure 4:
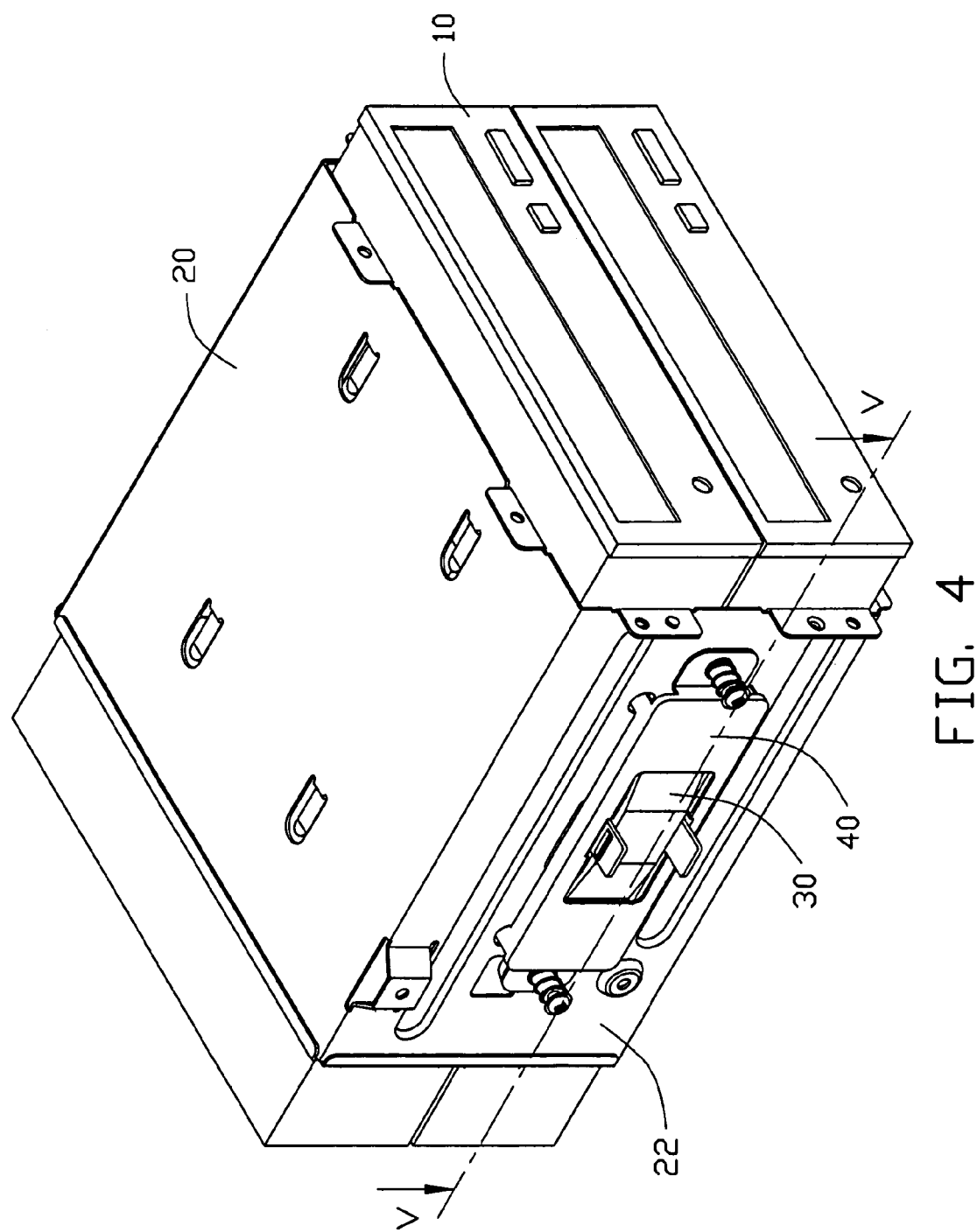
FIG. 4 is an assembled isometric view of the mounting assembly for data storage devices, showing the assembled relationship between the resilient member and the fixing member.
Figure 5:
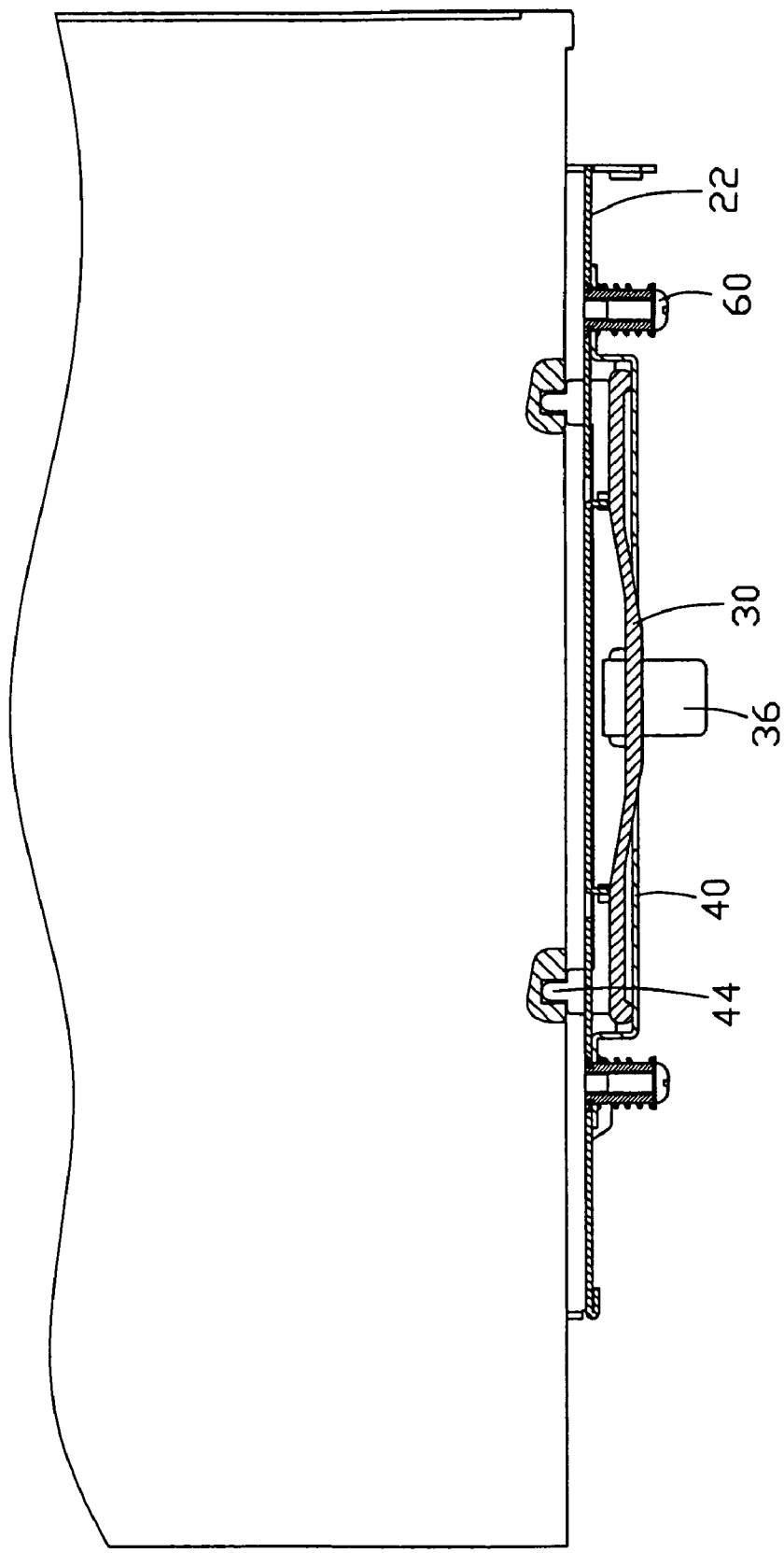
FIG. 5 is an assembled cross-sectional view of FIG. 4 along V—V, with partly cut off for better illustration.
Figure 6:
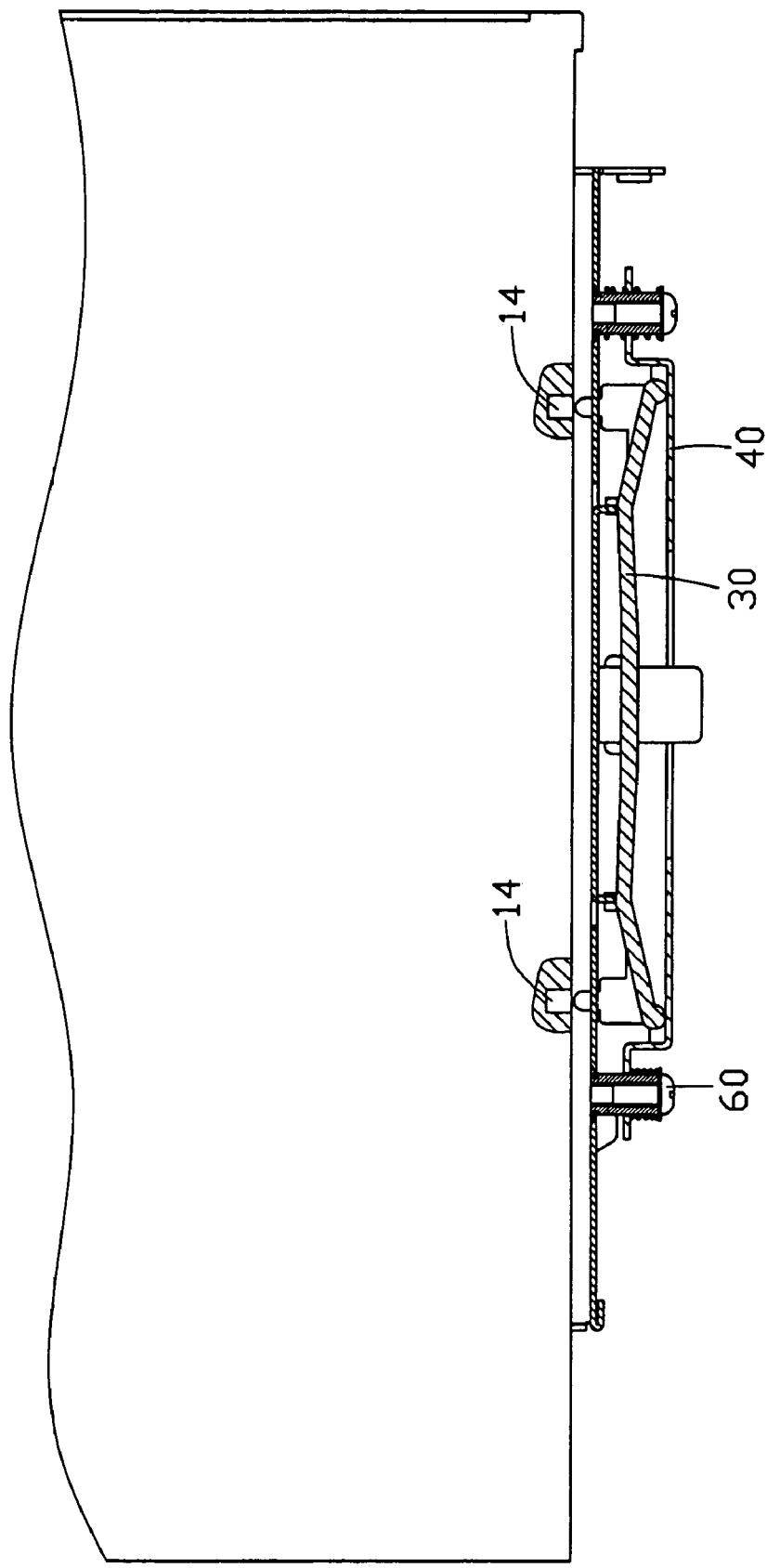
FIG. 6 is an disassembled cross-sectional view of FIG. 4 along V—V, with partly cut off for better illustration.

Referring also to FIG. 4 to FIG. 6, in assembly, when combining the resilient member 30 and the fixing member 40, the handles 36 face the fixing member 40, get through the rectangular opening 46, and the brim 48 presses the handle 36 along the slant face 382 until the blocking portion 38 of the handle 36 clasps the top and bottom edges of the opening 46. When combining the assembled fixing member 40 and the resilient member 30 with the cage 20, the pillars 26 get through corresponding mounting apertures 42, then the exterior tabs 29 on the side plate 22 of the cage 20 are received in a space defined by the receiving bases 32 of the resilient member 30, and the attaching pins 44 penetrate into the mounting holes 28 in the side plate 22 of the cage 20. In assembling the fixing member 40, the pillars 26 penetrate through the mounting apertures 42 of the fixing member 40, then the elastic portions 50 encloses corresponding pillars 26, and the attaching members 60 are received in the screw holes in the pillars 60, thereby fixing the fixing member 40 to the cage 20.

The data storage device 10 assembly, the pressing portion 31 is pressed, the curved wings of the resilient member 30 bended and the pushing portions 34 at free distal ends thereof rising to push the fixing member 40 from behind. Then the fixing member 40 moves apart from the side plate 22 of the cage 20 with the pushing of the pushing portions 32, and simultaneously each elastic portion 50 around the pillar 26 is compressed. Continue pressing the pressing portion 31, until blocking portions 38 hook the top and bottom edges of the rectangular opening 46, thereby the four attaching pins 44 completely retreating out from the mounting holes 28 of the side plate 22 of the cage 20. Thus, the data storage devices 10 are freely inserted into or drawn out from the cage 20.

The upper data storage device 10 is supported on the interior tabs 24, and inserted into the cage 20. When the rear the fixing holes 14 of a data storage device 10 passes the front mounting holes 28 of the side plate 22, the pair of handles 36 are pressed, detaching the blocking portion 38 from the fixing member 40. The pushing portions 34 of the released resilient member 30 no longer push the fixing member 40, and the elastic portion 50 come to reinstate. The reinstating elastic portion pushes the fixing member 40 toward the side plate 22, simultaneously the attaching pins 44 on the fixing member 40 resist upon sidewalls of the data storage device 10. As long as each of the fixing holes 14 of the data storage device 10 is aligned with each of the mounting holes 28 of the side plate 22, all of the attaching pins 44 automatically re-inserted into corresponding fixing holes 14, thereby mounting the data storage 10 into the cage 20.

Referring to FIGS. 6, in disassembly of the data storage device 10, the pressing portion 31 is again pressed, the curved wings of the resilient member 30 bended and the pushing portions 34 rising to push the fixing member 40 from behind. Then the fixing member 40 moves apart from the cage 20 with the operation of the resilient member 30, and simultaneously each elastic portion 50 around the pillar 26 is compressed. Continue pressing the pressing portion 31, until blocking portions 38 hook the top and bottom edges of the rectangular opening 46, thereby the four attaching pins 44 completely retreating out from the mounting holes 28 of the side plate 22. Then the data storage device 10 is drawn out from the cage 20.

While the present invention has been illustrated by the description of preferred embodiment thereof, and while the preferred embodiment has been described in considerable details, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative example shown and described.

What is claimed is:

1. A mounting assembly comprising:
   a data storage device, defining a plurality of fixing holes in one sidewall;
   a cage, adapted for receiving the data storage device, comprising a side plate, the side plate defining a plurality of mounting holes corresponding to the fixing holes of the data storage device, the side plate forming a first engaging means;
   a fixing member, engaging with the side plate of the cage and movable in a direction perpendicular to the side plate, a plurality of attaching pins extending from one side of the fixing member corresponding to the fixing holes of the data storage device, the fixing member defining an opening in the middle portion thereof and engaging a second engaging means, the second engaging means cooperating with the first engaging means to mount the fixing member to the cage, an elastic portion standing between the first and second engaging means; and
   a resilient member with two wings, received between the side plate of the cage and the fixing member, the resilient member comprising a pressing portion sticking out from the opening of the fixing member and a pushing portion at a free end of each of the wings to force the fixing member to move apart from the cage;

wherein the elastic portion cooperates with the resilient member so that the attaching pins on the fixing member are automatically inserted into or retreated from the fixing holes of the data storage device.

2. The mounting assembly as claimed in claim 1, wherein a plurality of interior tabs is inwardly extended from the side plate of the cage for supporting the data storage device, and a pair of exterior tabs is outwardly extended from the side plate for restraining the resilient member.

3. The mounting assembly as claimed in claim 2, wherein the resilient member forms a plurality of receiving bases for receiving the exterior tabs of the side plate.

4. The mounting assembly as claimed in claim 1, wherein the first engaging means comprises a pillar with a screw hole therein, the pillar extends from the side plate of the cage.

5. The mounting assembly as claimed in claim 4, wherein the fixing member defines two mounting apertures for receiving the first engaging means.

6. The mounting assembly as claimed in claim 1, wherein a pair of handle extends from the resilient member from respective opposite side edges thereof, and each handle forms a blocking portion to clip an edge of the opening of the fixing member.

7. The mounting assembly as claimed in claim 1, wherein the elastic portion comprises a spring.

8. The mounting assembly as claimed in claim 1, wherein the second engaging means comprises a screw.

9. A mounting assembly for securing a data storage device defining a plurality of fixing holes, the mounting assembly comprising:
   a cage, adapted for receiving the data storage device, comprising a side plate, the side plate defining a plurality of mounting holes corresponding to the fixing holes of the data storage device, the side plate forming a first engaging means;
   a fixing member, adapted for engaging with the side plate and movable along the first engaging means, a plurality of attaching pins corresponding to the fixing holes of the data storage device extending from the one side of the fixing member, a resilient member deformable comprising two wings, received between the side plate of the cage and the fixing member, the deformed resilient member pushing the fixing member to move apart from the cage; and
   an elastic component engaging the first engaging means, the elastic component engaging a second engaging means, the second engaging means cooperating with the first engaging means to mount the fixing member to the cage;
   wherein the resilient component cooperates with the resilient member, so that the attaching pins on the fixing member are automatically inserted into or retreated from the fixing holes of the data storage device.

10. The mounting assembly as claimed in claim 9, wherein the fixing member defining an opening in the middle portion thereof.

11. The mounting assembly as claimed in claim 10, wherein the resilient member comprises a pressing portion sticking out from the opening of the fixing member and a pushing portion at the free end of each wing to force the fixing member move apart from the cage.

12. The mounting assembly as claimed in claim 9, wherein a plurality of interior tabs is inwardly extended from the side plate for supporting the data storage device, and a pair of exterior tabs is outwardly extended from the side plate for restraining the resilient member.

13. The mounting assembly as claimed in claim 12, wherein the resilient member forms a plurality of receiving bases for receiving the exterior tabs of the side plate.

14. The mounting assembly as claimed in the claim 9, wherein the first engaging means comprises a pillar with a screw hole therein, the pillar extends from the side plate of the cage.

15. The mounting assembly as claimed in the claim 9, wherein the second engaging means comprises a screw.

16. The mounting assembly as claimed in the claim 9, wherein the fixing member defines two mounting apertures for receiving the first engaging means.

17. The mounting assembly as claimed in the claim 9, wherein a pair of handle extends from the resilient member from respective opposite side edges thereof, and each handle forms a blocking portion to clip an edge of the opening of the fixing member.

18. The mounting assembly as claimed in the claim 9, wherein the elastic component comprises a spring.

19. A mounting assembly adapted for securing a data storage device defining a plurality of fixing holes, comprising:
   a cage adapted for receiving the data storage device, comprising a side plate defining a plurality of mounting holes;
   a fixing member movably attached to the side plate of the cage, the fixing member defining an opening and forming a plurality of pins adapted to be extendable through the mounting holes of the cage and into the fixing holes of the data storage device;
   a resilient member sandwiched between the side plate of the cage and the fixing member, the resilient member comprising a pressing portion exposable in the opening of the fixing member, and at least one pushing portion formed next to the pressing portion for pushing the fixing member away from the side plate of the cage due to movement of the pressing portion.

20. The mounting assembly as claimed in the claim 19, wherein the movement of the pressing portion to cause the pushing portion to urge the fixing member moving away from the side plate is that the pressing portion moves toward the side plate.

* * * * *

UNITED STATES PATENT AND TRADEMARK OFFICE
CERTIFICATE OF CORRECTION

PATENT NO. : 7,180,734 B2 Page 1 of 1
APPLICATION NO. : 11/021924
DATED : February 20, 2007
INVENTOR(S) : Xiao-Zhong Jing It is certified that error appears in the above-identified patent and that said Letters Patent is hereby corrected as shown below:

On Title Page:

Item (73) Assignees, "Hong Fu Jin Precision Industry (Shenzhen) Co. Ltd. (CH)", should read --Hong Fu Jin Precision Industry (Shenzhen) Co. Ltd. (CN)--

Signed and Sealed this

Fourteenth Day of August, 2007

JON W. DUDAS
*Director of the United States Patent and Trademark Office*